Aug. 9, 1932.   B. A. PROCTOR ET AL   1,871,235
CARRIER FOR MATERIAL AND APPARATUS FOR USE THEREWITH
Filed Jan. 16, 1929
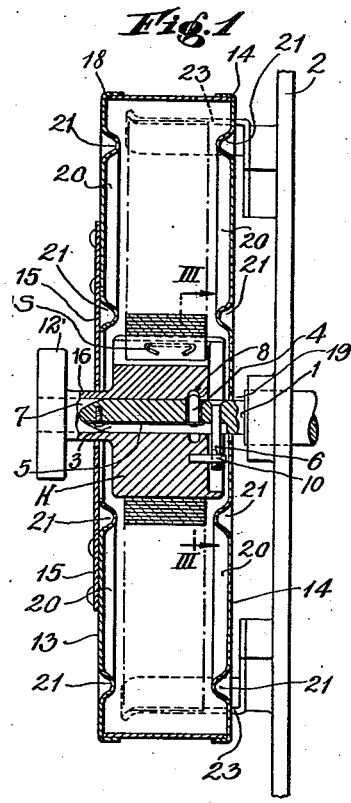
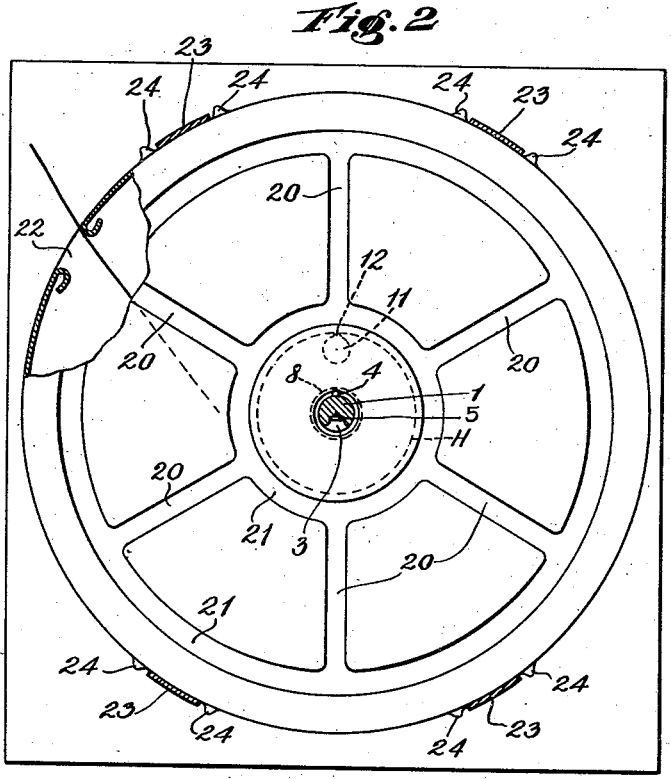
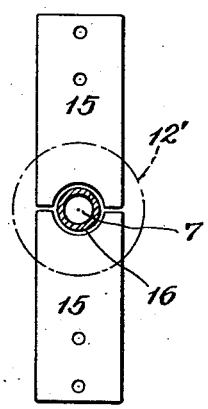
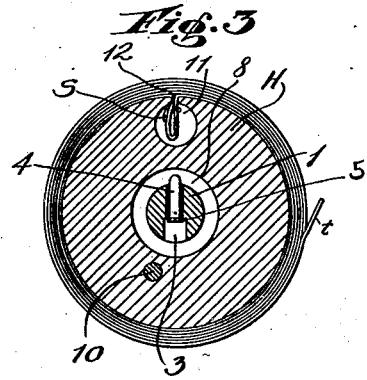
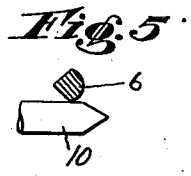
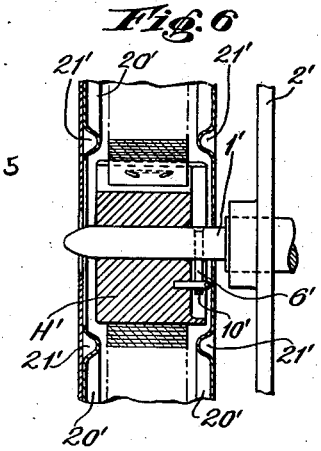
INVENTORS
BARTON ALLEN PROCTOR
EDITH DUNHAM FOSTER
CLARKSON ULYSSES BUNDICK
BY Waldo G. Morse
ATTORNEYS.

Patented Aug. 9, 1932

1,871,235

UNITED STATES PATENT OFFICE

BARTON ALLEN PROCTOR, OF PELHAM MANOR, NEW YORK, EDITH DUNHAM FOSTER, OF RIDGEWOOD, NEW JERSEY, AND CLARKSON ULYSSES BUNDICK, OF WHITE PLAINS, NEW YORK, ASSIGNORS, BY MESNE ASSIGNMENTS, TO KINATOME PATENTS CORPORATION, OF NEW YORK, N. Y., A CORPORATION OF NEW YORK

CARRIER FOR MATERIAL AND APPARATUS FOR USE THEREWITH

Application filed January 16, 1929. Serial No. 332,882.

Our invention can be applied to any art in which material is fed from or to a carrier and is particularly useful in connection with carriers for films, whether for light sensitive material for cooperation with a camera or sound recording apparatus or for image bearing material for cooperation with a motion picture or stereoptican projector or with a sound reproducing instrument or with an apparatus adapted for the simultaneous reproduction of visual images and sound.

An object of our invention is to provide a holder for film or other material which can be constructed at minimum cost, is of light weight, can be simply and quickly placed in operative relation with a film handling apparatus, and effectively cooperates therewith during the feeding of the film by said apparatus from or to said holder. We provide a holder which consists merely of a supporting cylindrical element or hub, without sides or the like extending therefrom, upon which the film or other material is rolled and from which it is unrolled, this hub being positioned within an outer protective casing. We guide the film thereto and therefrom by means of guides placed within or preferably constructed as a portion of the container. According to one form of our invention we modify the ribs ordinarily used in formed sheet metal to give additional strength so that they serve as such guides. As a result we are able to dispense entirely with the cost as well as the weight of the reel sides, the expense and trouble of their assembly, and the difficulties which are caused by their becoming misshapen through handling. A film holder, constructed according to our invention, which may be shipped in perfect safety within a light pasteboard box, will require less postage than a conventional sized reel of the same capacity which must be placed within a metal box and a pasteboard carton. We provide improved means whereby this film-supporting element may be properly positioned upon and driven by the appropriate spindle of the film handling mechanism with which it cooperates and improved means for supporting the outer protective casing upon the apparatus. These positioning means are immediately effective when the user has pushed the hub upon the supporting spindle, irrespective of the relative position of hub and spindle. Therefore, it is not necessary for the user to fit a particular portion of the film-supporting element, such as a keyway, for example, upon a particular portion of the spindle, such as a key, for example, and then push the film-supporting element into position. In a preferred modified form of our invention, this film supporting element automatically finds and maintains its proper axial position without the use of special mechanical means.

We have found that under many conditions, the use of this simpler structure results in better conditions of film feeding than does the use of a conventional reel with sides within an outer protective casing. The film is fed with less strain, due to the elimination of the weight of the sides of the reel, and due to the great reduction in friction upon the edges of the film. We find that a film positioned on such a hub and guided by occasional contact with the guiding elements of the outer container instead of by continuous contact with the side walls of a conventional reel feeds very much more readily with less likelihood of movement lateral to the gate of the projector or camera in which it is being used.

Another object of our invention is the provision of improved means for attaching the film to its support.

Other objects, advantages and characteristics are apparent in the following description, the attached drawing and the subjoined claims. Although we are showing one preferred embodiment of our invention, it will be readily understood that we are not limited to this particular construction as changes can readily be made without departing from the spirit of our invention or the scope of our broader claims.

In the drawing:

Figure 1 is a sectional view of a film holder in assembled relation with a film feeding mechanism.

Figure 2 is a side view of the same, certain of the parts being broken away.

Figure 3 is a detail sectional view on an enlarged scale of the hub and spindle taken along the line III—III in Figure 1.

Figure 4 is a view of means employed to hold the hub within the container.

Figure 5 is a detail view on an enlarged scale of the driving and driven pins.

Figure 6 is a sectional view of a portion of a preferred modification of a film holder in assembled relation with a film feeding mechanism.

In carrying out our invention, we may provide a spindle 1 suitably journaled for rotation in a film feeding apparatus a side wall 2 of which is shown in the drawing. The spindle 1 may be driven or permitted to turn idly, or at some periods in the cycle of operation be permitted to idle and at other periods to be driven. In a spline 3 in the spindle 1 we attach a pin 4 as by the flat spring 5 or in some other suitable manner. The pin 4 is forced upwardly by the spring 5 and forms a spring pressed latch or positioning element. The head of the pin may be rounded. At or near the end of the spindle we place a wedge shaped driving pin 6, with the apex of the wedge pointed outwardly, (Figure 5).

The hub H or film support may be provided with an axial opening 7 adapted to co-act with the spindle 1 so that the hub may be placed thereupon over an end thereof and supported and driven thereby. Within the opening 7 we may provide an annular depression 8 the plane of which is at right angles to the axis of the hole 7 and the spindle 1. Projecting inwardly from the inner face of the hub there may be placed a wedge shaped driving pin 10 the apex of the wedge facing inwardly. This driving pin may be formed from the same piece from which the hub is made or in case the hub is constructed of brass or aluminum it may be a suitable pin suitably secured thereto. The hub may if desired be die-cast from aluminum, to save weight and cost.

To assist in connecting the film to the hub there may be provided, slightly below the outer surface of the hub, an opening 11, as is clearly shown in Figure 3 of the drawing. Extending from the periphery of this opening to the sides of the hub is a narrow slot 12. In carrying out our invention we may prefer to attach the film to the hub by means of a length of heat resisting material such as a tape, $t$, as is described in the co-pending application of Barton Allen Proctor Serial Number 54,910 filed September 8, 1925. In such case we have found it convenient to double over the tape $t$ and fasten it upon itself as with a light staple $s$ such as is commonly used in attaching sheets of paper together. We then slide the tape laterally through the slot 12, the doubled-over portion lying within the opening 11, its thickness being sufficient to prevent it from passing through the slot when tension is applied to the film. Or, the film itself may be so treated, or a small piece of cloth may be stapled to the end of the film to form such an enlargement. In assembling films and their carriers the labor cost is a considerable item, and the economy of the above means of attachment is important.

The above described hub may be placed within a magazine or container of any well-known type such as that described in the co-pending application of Barton Allen Proctor before recited.

The hub H may be positioned within the outer protective casing so that the handle 12' protrudes beyond the outer wall 13 of the container. As is clearly shown in Figure 4, the hub may be prevented from passing entirely without the container as by strips 15 the inner ends of which may be formed with outwardly facing semi-circles so that when they are brought together over the neck 16 of the hub they prevent undue movement thereof. We have found it desirable, however, to make the opening in these two strips sufficiently larger than the diameter of the neck 16 so that there is no frictional resistance when the parts are in assembled relation upon the film handling apparatus.

The inner wall 14 of the outer protective casing may be provided with an opening 19 coaxial with that of the hub, so that the spindle may readily be inserted therethrough. This opening may be made of somewhat greater diameter than that of the spindle so that when the film holder is in operative relation with the film handling mechanism there will be no friction therebetween.

In order to guide the film within the casing we may place guide strips within the same or preferably we may form the sides of the containers with inwardly extending ribs or grooves. We may use either ribs 20 radial to the axis of the hub or ribs 21 concentric therewith or both. It will be readily understood by those skilled in the art that reel sides or containers which are ordinarily made from stamped metal are generally provided with depressions or ribs in order to strengthen them. When the sides of a reel are placed in assembled relationship, the openings of these grooves or ribs are placed inwardly, the expanded portion of the metal extending outwardly. We reverse this practice by placing the openings of the grooves or ribs outwardly, and the expanded portion inwardly. Thus it will be understood that we may make use of the groove or rib which is commonly used to strengthen sheet metal to accomplish one of the desirable objects of our invention without any cost whatever. We have found it desirable to permit the film some slight freedom of movement within the hub. Consequently we space these guiding ribs or members slightly more than the width of the film which is being fed from and to the hub.

It will be readily understood that the opening 22 through which the film passes may be provided with a light trap to prevent the fogging of film within the casing when light-sensitive film is positioned therein as for use within a camera.

To place the assembled magazine in operation, the user moves it toward the wall 2 of the film handling apparatus, the spindle 1 entering the opening 19 in the inner wall 14 of the container and the opening 7 in the hub. The container is supported by and centered upon the apparatus as by the flat springs 23 which project therefrom. The user pushes the knob 12' toward the apparatus, since the hub is movable relatively to the container, and the pin 4 slips into the annular ring 8 thereby axially positioning the hub independently of the container and preventing the accidental removal of the hub from the spindle. As the spindle 1 is caused to rotate by the application of power thereto in any well-known way not shown, the post 6 upon the spindle engages with the post 10 upon the hub so that the hub is driven. If by chance the hub and spindle should be so positioned that the user pushes the post 10 directly against the post 6 the characteristics of the posts would cause one to slide past the other as is clearly shown in Figure 5 of the drawing, so that the hub can be pushed inwardly until in its proper axial position upon the spindle. Rotation of the outer protecting casing relatively to the film handling apparatus is prevented as by the detents 24 which may be formed in the side portion of the casing.

It will be readily understood by those skilled in the art that when a film holder constructed in accordance with our invention is in cooperative relationship with the film handling mechanism, the inner film supporting hub is freely revoluble within the outer casing, there being no frictional resistance whatever between it and the outer protective casing. The hub having been properly positioned axially upon the spindle, the film, as it is fed from or to the hub, bears lightly if at all against the spaced guiding elements. If, however, owing to the uneven shrinkage or warping of the film, damage to the casing, improper alignment of the gate of the mechanism or any of the many minor difficulties which constantly arise in connection with a film feeding apparatus, such guiding is necessary, it is applied lightly to several small sections of the edge of the film, these sections being so spaced that the film is guided throughout its entire operative length within the container.

As is clearly shown in Figure 6, in a preferred modification of our invention we may provide an inner hub H' which is not axially positioned or held by mechanical means upon the spindle 1', supported by the frame 2' of the apparatus, but is permitted to float upon such spindle. It will be readily understood that the traction of the film itself as it is fed from the container and guided as by the ribs 20' and 21' tends to draw the hub to its proper axial position and to hold it therein.

Certain of the advantages of our invention are evident from the foregoing portion of this specification.

Other advantages of our invention arise from the provision of a film holder which can be more cheaply manufactured than is usual in the art from and to which a film can be fed with less strain than is common with the present type of film holders. Still further advantages of our invention arise from the provision of simple means whereby a film supporting element may be axially positioned upon a spindle and driven thereby, and in the provision of a driving member upon the appropriate spindle designed to cooperate with a driving member upon the film supporting element, these two members being so constructed that they will not interfere with each other as the film holder is placed in assembled relationship with the apparatus. A still further advantage arises from the provision of simple and inexpensive means to attach the film to its supporting element.

A still further advantage of our invention lies in the provision of improved means whereby the film supporting member may be axially positioned upon and supported by a spindle independently of the positioning and support of the outer protective casing upon the apparatus.

We claim:

1. Film handling apparatus, including a revoluble spindle mounted upon said apparatus, positioning means mounted upon said spindle, an enclosing casing, a film supporting member positioned therewithin and revoluble relatively thereto, said casing and said member having aligning axial openings for the reception of said spindle, a structure disposed upon said member adjacent said axial opening for cooperation with said positioning means mounted upon said spindle, and means whereby said casing is supported by said apparatus independently of said spindle, said positioning means and said structure being so constructed and arranged that when said member is moved along said spindle to a predetermined point they cooperate to position said member and said spindle relative to each other irrespective of the position thereof in a plane, passing through such point, normal to the axis of said spindle.

2. Film handling apparatus, including a revoluble spindle mounted upon said apparatus, positioning means mounted upon said spindle, a driving element mounted upon said spindle, an enclosing casing, a film supporting member positioned therewithin and revoluble relatively thereto, said member and said casing having aligning axial openings for the reception of said spindle, a formation disposed upon said member adjacent said axial opening for cooperation with said positioning means, a driving element disposed upon said member adjacent said opening, and means whereby said casing is supported by said apparatus independently of said spindle, such positioning means, said means and said formation being so constructed and arranged that when said member is moved along said spindle to a predetermined point they cooperate to position said member and said spindle relative to each other irrespective of the position thereof in a plane, passing through said point and normal to the axis of said spindle, and said driving elements being so constructed and arranged that irrespective of their relative position radial of the axis of said spindle upon one revolution or less of said revoluble spindle they cooperate to transmit power therefrom to said member whereby said member is revolved by said spindle.

3. Film handling apparatus, including a revoluble spindle mounted upon said apparatus, positioning means mounted upon said spindle, an enclosing casing, a film supporting member positioned therewithin and revoluble relatively thereto, said casing and said member having aligning axial openings for the reception of said spindle, positioning means disposed upon said member adjacent said axial opening for cooperation with said positioning means mounted upon said spindle, one of said positioning means being yielding, said positioning means being so constructed and arranged that when said member is moved along said spindle to a predetermined point they cooperate to position said member and said spindle relative to each other irrespective of the position thereof in a plane, passing through such point and normal to the axis of said spindle, positive means whereby said member is revolved by the rotation of said spindle, and means whereby said casing is supported by said apparatus independently of said spindle.

4. In combination, film handling apparatus including a supporting spindle and a substantially cylindrical film carrier, said film carrier having a substantially cylindrical axial opening therein adapted for the reception of said spindle, an annular groove formed in the portion of said support bounding said opening, said groove being disposed in a plane normal to the axis of said opening, and forming shoulders, a positioning element mounted upon said spindle and constructed to cooperate with said shoulders, a driving pin mounted upon said carrier, and a driving pin mounted upon said spindle and adapted for cooperation with said first mentioned pin, each of said pins including sections constructed in wedge shape and arranged to face each other.

5. The method of attaching a film to a carrier which comprises attaching one end of the film to one end of a fabric leader strip, doubling the opposite end of such strip back upon itself and fastening it thereto while in such position, providing a cylindrical film support having an opening substantially parallel to the axis of the support and a slot of a width less than the diameter of such opening and connecting such opening with the periphery of said support, such opening and such slot having corresponding open ends, and simultaneously sliding such doubled portion of said strip into such opening and the single portion thereof adjacent thereto into such slot by a movement of said strip in a direction substantially parallel to the axis of such support.

6. The method of attaching a film to a carrier which includes doubling one end of the film back upon itself and fastening it to itself while in such position, providing a film support with a substantially cylindrical outer surface and an opening parallel to the axis of such support adjacent such surface, said opening and said surface being joined by a slot of a width less than the diameter of such opening, such opening and such slot having corresponding open ends, and sliding the doubled portion of the film into such opening and the adjacent single portion into such slot by a movement parallel to the axis of such support.

7. In combination, a film handling mechanism and a film support for use therewith; said film support being substantially cylindrical and freely revoluble within an outer protective casing and said film support having an axial opening adapted to cooperate with a supporting spindle, and having an annular groove communicating with said opening and forming shoulders, disposed in a plane substantially at right angles to the axis of said opening, constructed to cooperate with a positioning element carried by said spindle, a driving pin adapted to cooperate with a driving pin carried by said spindle, there being a second opening substantially coaxial with said first mentioned opening, said second mentioned opening being connected with the surface of said cylinder by a slot adapted for the reception of a film therein; said protective casing comprising means adapted at a plurality of points to cooperate with said film to guide the same as it is wound upon or unwound from said support; said mechanism comprising means for supporting said outer protective casing independently of said film support, and a spindle; said spindle including positioning means adapted to cooperate with said shoulders of said film support and a driving pin adapted to cooperate with the driving pin of said film support.

8. In combination, a film support and a film; said film support comprising a substantially cylindrical hub without side plates which has an axial opening for the reception of a supporting spindle and a second opening the axis of which is substantially parallel with that of such first opening, such second opening being connected with the outer circumference of said hub by a slot of a width less than the diameter of such second opening, such second opening and such slot having corresponding open ends; said film having a fabric leader strip attached to one end thereof, the opposite end of said strip being doubled back upon itself and fastened thereto, whereby such doubled portion may be placed in such second opening by a movement of said film in a direction substantially parallel to the axis of such openings and the single portion adjacent such doubled portion may be placed in such slot by such movement, for the purpose of attaching said film to said support whereby it may be wound thereupon.

Signed at New York city, in the county of New York and State of New York, this 28th day of December, A. D. 1928.

EDITH DUNHAM FOSTER.
BARTON ALLEN PROCTOR.
CLARKSON ULYSSES BUNDICK.